United States Patent [19]

Harms

[11] Patent Number: 4,715,964

[45] Date of Patent: Dec. 29, 1987

[54] METHOD FOR FILTERING CONTAMINATED LIQUIDS

[75] Inventor: Eugene H. Harms, Perrysburg, Ohio

[73] Assignee: Henry Filters, Inc., Bowling Green, Ohio

[21] Appl. No.: 932,317

[22] Filed: Nov. 19, 1986

[51] Int. Cl.⁴ .................. B01D 27/04; B01D 33/04
[52] U.S. Cl. .................................. 210/783; 210/806; 210/251; 210/297; 210/387
[58] Field of Search ............... 210/767, 780, 783, 168, 210/171, 251, 294, 295, 297, 314, 316, 387, 400, 401, 806

[56] References Cited

U.S. PATENT DOCUMENTS

Re. 32,135  5/1986  Creps et al. .................. 210/260
4,440,642  4/1984  Frese et al. .................. 210/387

*Primary Examiner*—Frank Sever
*Attorney, Agent, or Firm*—Nixon & Vanderhye

[57] ABSTRACT

A method of filtering coolant for a central coolant system supplying clean coolant to a plurality of machining stations. The method simultaneously filters the coolant in a single tank through both a perforate drum filter and a paper filter to obtain clean coolant of two distinct clarity levels. The coolant of enhanced clarity resulting from the operation of the paper filter either can be supplied to a machine requiring such coolant clarity (e.g., a gun drill) or can be used as a "polishing filter" to remove fines from the coolant in the central system.

6 Claims, 7 Drawing Figures

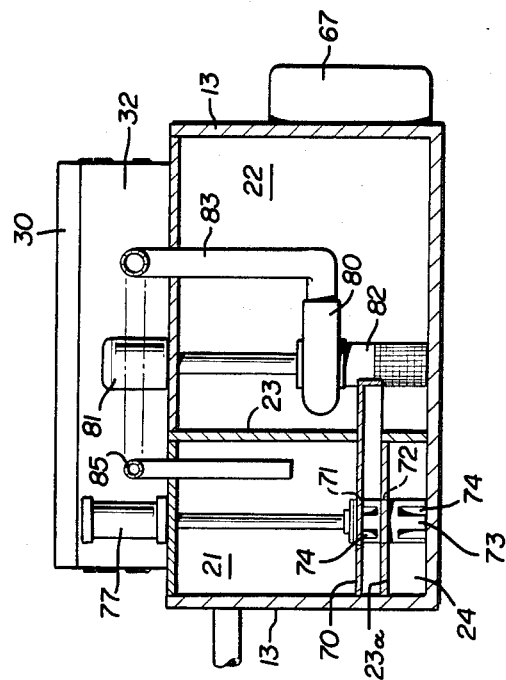
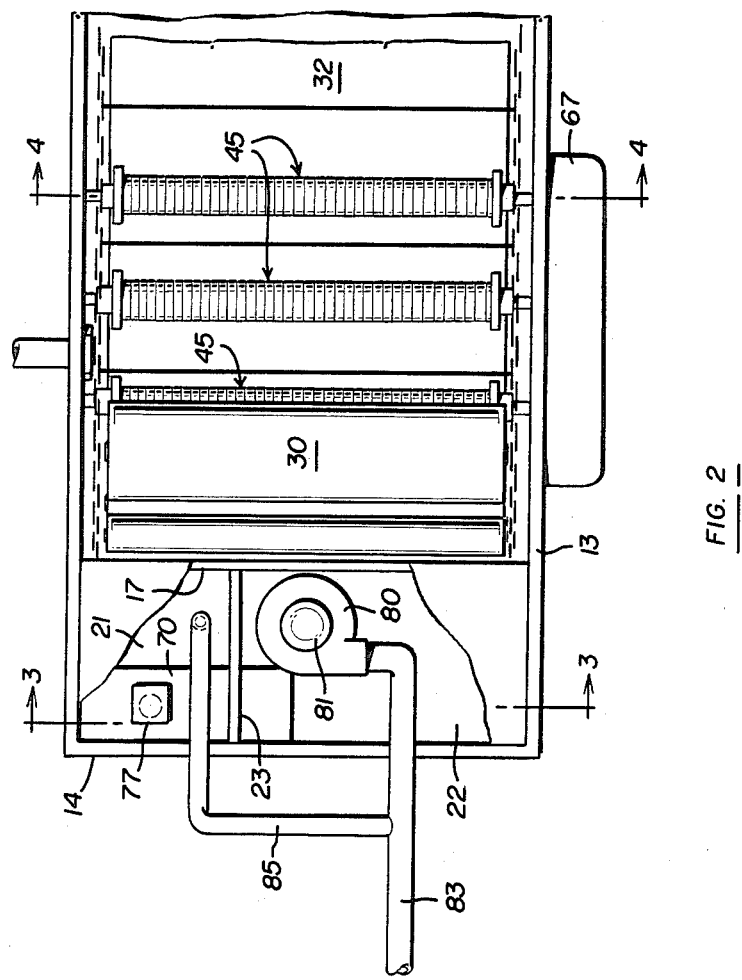
FIG. 3
FIG. 2

METHOD FOR FILTERING CONTAMINATED LIQUIDS

BACKGROUND AND BRIEF DESCRIPTION OF THE INVENTION

In central coolant systems for machining operations, soluble oil coolant is circulated to individual work stations, e.g., machining or parts washing equipment, to cool the parts being processed and to flush machining waste from the parts. The dirty coolant flows to a common filtration station, where the liquid coolant is separated from the solid waste, and the coolant is then recirculated back to the work stations.

A conventional, high volume, fixed media or drum filtration system, such as that disclosed in U.S. Pat. No. Re. 32,135, will remove solid waste to obtain a coolant clarity level of about 10–20 PPM (parts per million) particles of a size of about 10 to 15 microns.

Finer degrees of filtration are required for operations where the clarified coolant must flow through extremely small ports or apertures. For example, in a gun drill and in certain washer applications, clarification to a level of 3–5 PPM and a size of 3 to 5 microns is required. Further, washer fluids for washing machining waste from an engine block, for example, may contain detergents which leave a residue on the washed parts to which even the smallest particles may adhere. Also, the coolant may be rendered unusable after long-time operation by the accummulation therein of "fines" or particles passing through the filtration system and remaining in the circulation flow. For these applications requiring a finer degree of particle removal, filtration through paper media is required. To obtain the requisite particle removal, a "tight" paper is necessary, but the flow rate must be greatly reduced.

The present invention proposes a novel filtration system utilizing both a fixed media drum filter and a media paper filter disposed in a single tank to provide an input flow of filtrate at two distinct clarity levels. The drum filter delivers a high volume flow of filtrate at a first clarity level, e.g., 10 to 20 parts per million of from 10 to 15 micron particles; and the paper filter delivers a substantially smaller volume flow per square foot of surface area at a second clarity level, e.g., 3–5 parts per million of 3–5 micron particles.

The two distinct types of filters are immersed in a common tank full of dirty liquid. The drum filter removes the larger particles from a high volume of liquid, the particles accreting onto the drum surface for periodic removal, as by a fixed scraper against which the drum rotates. The particles removed from the drum usually agglomerate and sink into the common tank. The paper filter is located at the bottom of the common tank to filter liquid from the tank at a much lower flow rate, but at a higher clarity level. The paper is indexed according to the pressure drop across the paper as the paper clogs from the dirt accreted thereon.

Liquid is pumped by a clean liquid pump from the interior of the drum, and the same or a different clean liquid pump pumps clean liquid from the vacuum chamber underlying the paper media.

The contaminants scraped from the drum are removed from the tank by a scraper conveyor which also serves to move the paper as it is indexed over the vacuum chamber.

Typically, the paper of the paper filter is a very "tight" paper to give better cleanliness of the filtered liquid, and the flow rate through the paper is quite low, e.g., on the order of 5 gallons per minute per square foot. Under these circumstances, a clarity of 3 to 5 PPM and an average particle size of 3 to 5 microns can be maintained.

Further, because of the vacuum chamber at the bottom of the dirty liquid tank, the accreted dirt scraped from the drums is pulled downwardly toward the paper filter, either to be filtered onto the paper or to be carried out by the scraper conveyor. Consequently, a smaller than usual dirty liquid tank with minimal retention time, on the order of 1 to 2 minutes can be provided, rather than a much larger tank normally required for the 5 to 7 minutes retention time necessary for settling of the dirt scraped from the drum filter.

The combined filtration unit of the present invention can be used in either one of two modes of operation. Where the liquid of greater clarity is required for a separate operation, such as gun drill or the like, the paper filter vacuum chamber may be evacuated by a separate pump which is utilized to convey on the paper-filtered liquid to the gun drill working stations, while the liquid of less clarity from the drum filters is supplied to other machining operations. Where the paper filter is utilized in a "polishing" mode to remove fines from the coolant on a bypass-type operation, a single pump is utilized for both filtration units with about about 20% or less, preferably 10% or less of the liquid being filtered at the paper filter. Over a period of time, it has been found that such a bypass operation effectively removes the fines from the circulating coolant liquid and materially prolongs the life of the coolant.

BRIEF DESCRIPTION OF THE DRAWINGS

FIG. 2 is a partial plan view, with parts broken away and in section, of the filtration apparatus of FIG. 1.

FIG. 3 is a vertical transverse sectional view taken along the plane 3—3 of FIG. 2.

DETAILED DESCRIPTION OF THE INVENTION

Figure 1:
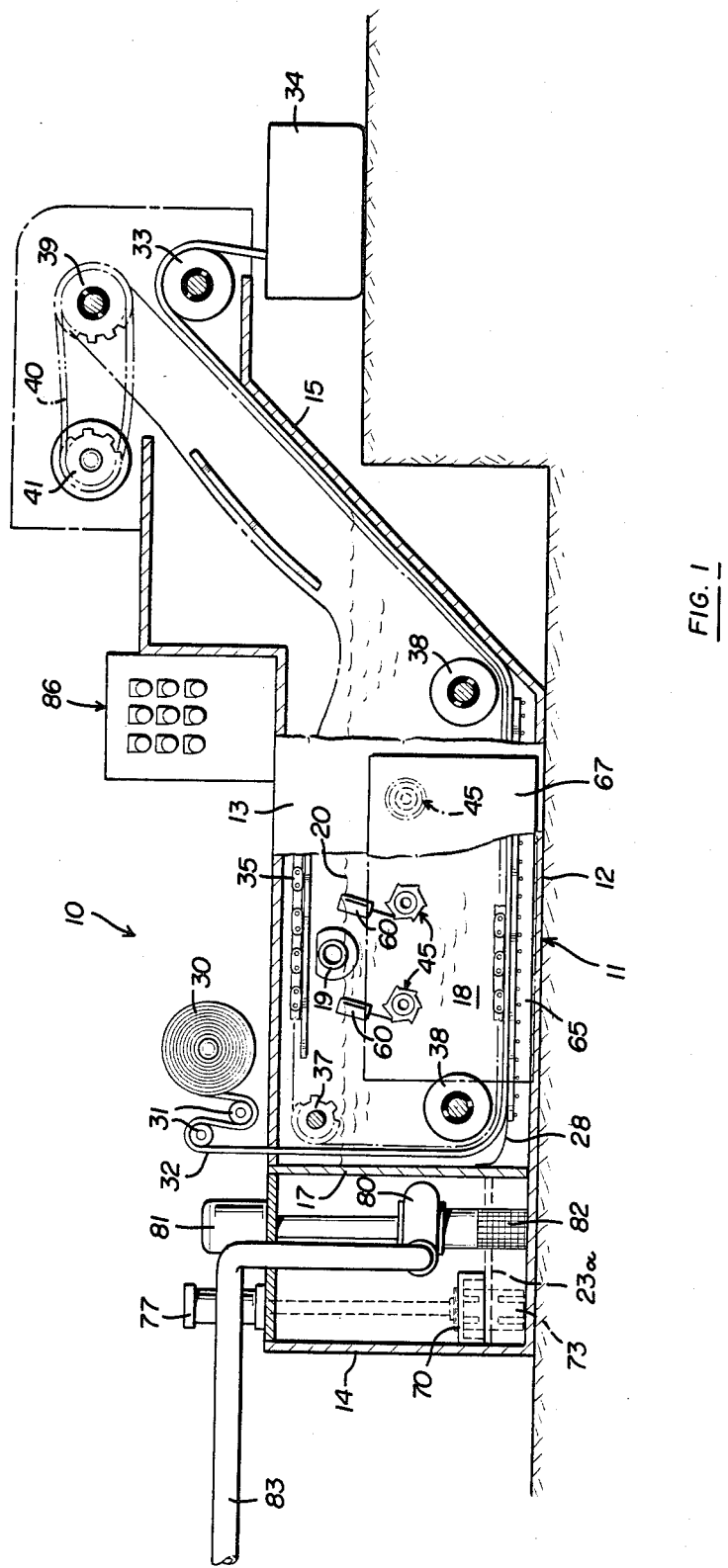
FIG. 1 is a longitudinal sectional view, with parts shown in elevation, of a filtration appartus of the present invention capable of carrying out the filtration method of the present invention.

As best shown in FIGS. 1 through 6, the reference numeral 10 refers generally to the apparatus of the present invention which is capable of carrying out the filtration method of the present invention. Generally, the apparatus 10 includes a tank 11 comprising a bottom wall 12, upstanding side walls 13 (FIG. 4), a vertical end wall 14 and an upwardly sloping end wall 15. The tank 11 is subdivided by an interior wall 17 parallel to the wall 14 to provide a dirty liquid space 18 receiving dirty liquid, i.e., liquid from the various machining stations and containing solid contaminant particles. The dirty liquid is introduced into the space 18 by an inlet pipe 19, and the space 18 is filled to approximately the level 20 with such dirty liquid.

A longitudinal vertical wall 23 subdivides the space between the end wall 14 and the interior wall 17 into a clean liquid tank space 21 and a pump space 22, and the clean tank space 21 lies above an elevated bottom wall 23a cooperating with the bottom wall 12 of the tank to provide a space 24 (FIGS. 1 and 3).

Located in the bottom of the tank 11 (FIG. 4) lying parallel to the bottom 12 is a perforate paper support 25 comprising longitudinally extending, transversely spaced wedgewire support elements 26 enclosed within a perimetric frame 27 and supported on longitudinally spaced, transversely extending support rods 28 fixedly secured to the frame 27. The frame 27 is joined to the clean tank bottom by a partition 28 (FIG. 1).

A paper supply roll 30 is supported (by means not illustrated) above the tank 11. Paper from the roll 30 passes about a pair of guide rolls 31, so that the paper web 32 extends vertically along the front face of the wall 17 downwardly and then horizontally to be superimposed over the perforate paper support 25. The paper is then trained up the inclined wall 15 and about a paper discharge roll 33 for collection in a suitable receptacle, such as a tote box 34. The paper 32 is held down against the support 25 and is advanced by means of a dual chain link conveyor 35 provided with spaced, transversely extending slats 36 (FIG. 4), the chains 35 being guided about sprockets 37 and guide rolls 38 to urge the paper downwardly against the support 25. The chain 35 is driven by a drive sprocket 39 lapped by a drive belt 40 trained about a driving sprocket 41 driven by suitable means, as by an electric motor.

Located in the tank 11 above the lower screen element 25 are a plurality of filter drums indicated generally at 45. These filtration drums may be of the type disclosed in Reissue Pat. No. 32,135, incorporated herein by reference. Alternatively, the drum may be of the type sold by Henry Filters, Inc. of Bowling Green, Ohio, the assignee of the present invention, as the "Henry Removable Rotary Wedgewire Screen Suction Module," available in larger sizes, i.e., up to 2 feet in diameter and 12 feet in length.

Figures 4, 5:
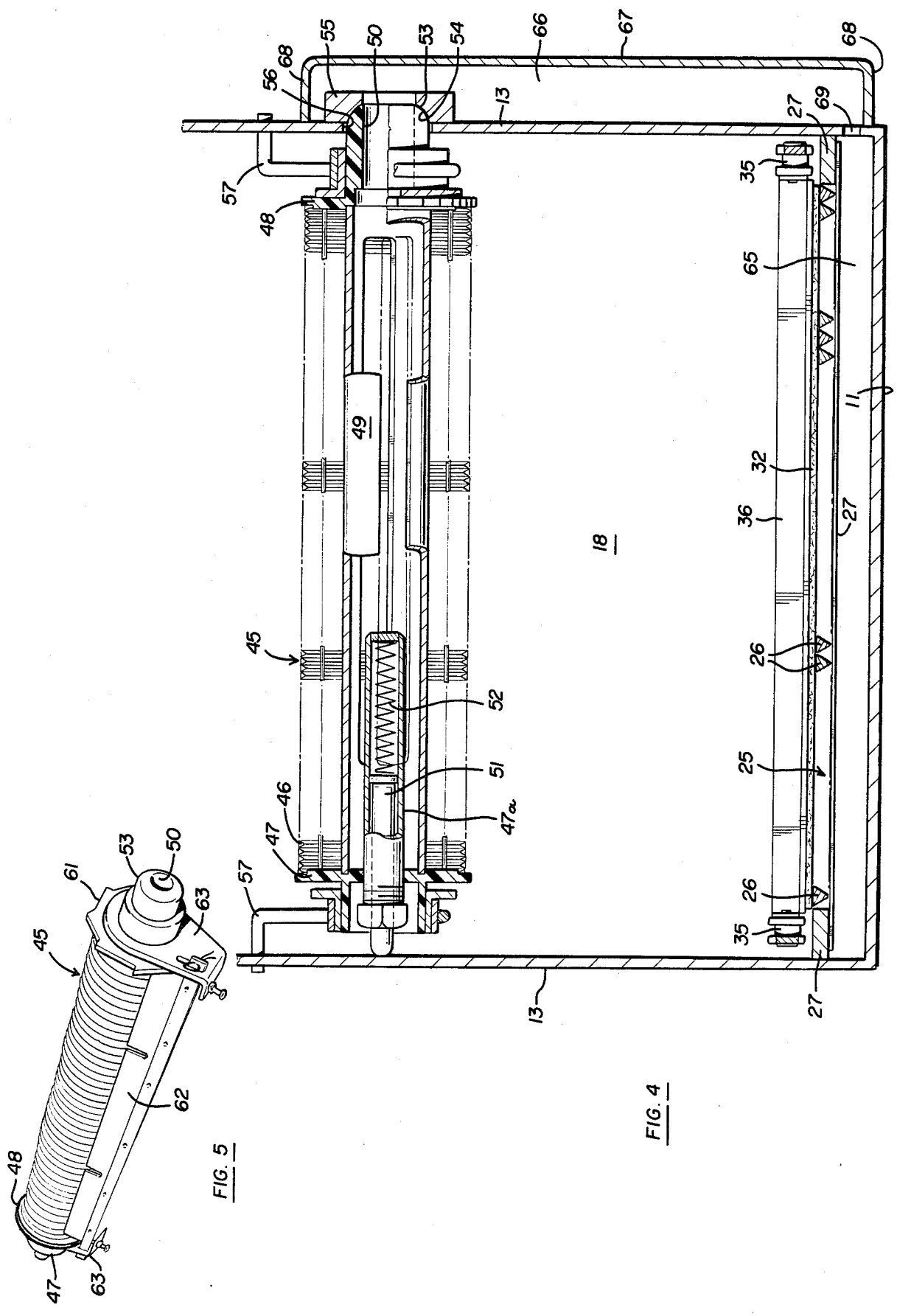
FIG. 4 is a transverse vertical sectional view similar to FIG. 3 but taken along the plane 4—4 of FIG. 2.
FIG. 5 is an elevational perspective view of a drum filtration element of the present invention.

As best shown in FIGS. 4 and 5 of the drawings, the drum 45 comprises a spirally-wound wedgewire periphery 46 supported on end caps 47, 48 and having an axially extending, slotted outlet conduit 49 communicating with an axial outlet bore 50 in the end cap 48. The end cap 47 carries a cylindrical guide tube 47a provided with a plunger 51 which is axially outwardly urged by a spring 52 against the interior of one side wall 13. The plunger 51 urges the drum 45 to the right (as shown in FIG. 4) to position a partially spherical end surface 53 of the cap 48 against the correspondingly-shaped convex seat 54 of a seal ring 55 fixedly secured to the outer surface of the other side wall 13. Side wall 13 is apertured as at 56 so that the end cap projection projects through the wall against the seat 54. To aid in positioning the drum assembly 30 in the tank 11, a pair of support fittings 57 fixed to the side walls 13 engage the end caps 47, 48.

The drum 45 is adapted to be rotated in a stepwise fashion by a fluid-actuated motor, such as a pneumatic cylinder 60 (FIG. 1), engaging the notched periphery 61 of the end cap 47 at one end of the drum. The drum is rotated against a scraper blade 62 mounted on a pair of attachment plates 63 journalled on the end caps 47, 48.

As best shown in FIGS. 1 and 4, the perforate paper support 25 is spaced above the bottom wall 12 of the tank 11 to provide a vacuum chamber 65 therebetween. From FIGS. 1 and 2, it will be seen that three drums 45 are provided in the illustrated embodiment of the invention, and these drums each have their discharge openings 50 in communication with a discharge chamber 66 located outside the confines of the tank 11 and defined by a formed sheet metal enclosure having a vertical wall 67 parallel to the one side wall 13 and peripheral side walls, e.g., top and bottom walls 68 joined to the side wall 13. The chamber 66 communicates with the vacuum chamber 65 beneath the perforate paper support 25 though an elongated slot 69 in the side wall 13 (FIG. 4).

The vacuum chamber 65 communicates freely with the space 24 underlying the clean tank 21, and the pump space 22 is isolated from the vacuum chamber by the vertical wall 17. A transverse duct 70 (FIGS. 2, 3 and 6) is superimposed on the wall 23a underlying the clean tank 21, this duct defining a flow path which is the only connection between the space 24 and the pump space 22 and between the clean liquid tank 21 and the pump space 22. This duct 70 has an aperture 71 aligned with an aperture 72 in the bottom wall 23, and a vertically extending, cylindrical valve body 73 is positioned in the apertures 71, 72 to extend from the upper surface of the duct 70 to the bottom tank wall 12. The valve body 73 is provided with peripherally spaced flow slots 74 both above and below the wall 23 but not traversing the wall 23. These slots 74 accommodate the flow of liquid from vacuum chamber 65 and the space 24 into the duct 70. That portion of the duct 70 extending into the pump chamber 22 is open on the bottom, as at 70a, for the flow of clean liquid from the duct into the space 22.

Figure 6:
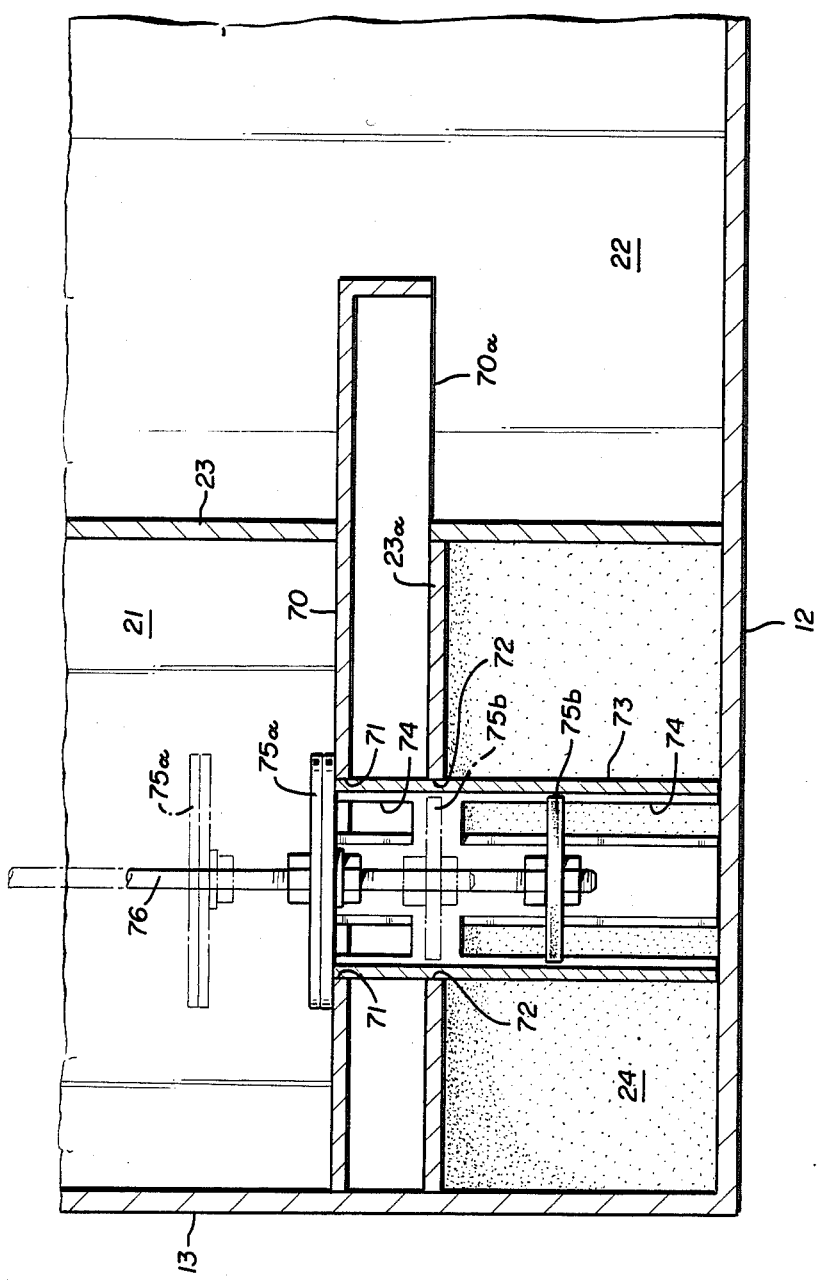
FIG. 6 is an enlarged, fragmentary view of a portion only of FIG. 3.

As best shown in FIG. 6, a flat poppet valve 75a carried by a vertical valve stem 76 normally closes the open upper end of the valve body 73 and prevents the flow of liquid from the duct 70 into the clean liquid tank 21. A second flat valve 75b is fixed to the lower end of the stem 76. A fluid pressure motor, for example, an air cylinder, 77 is provided to actuate the valve stem 76 and the poppet valves 75a and 75b carried thereby. When the motor is actuated as shown in FIGS. 3 and 6, the poppet valve 75a closes the open upper end of the valve body 73 and the lower valve 75b is positioned in the valve body 73. When the motor 77 is actuated to raise the valve stem 76 and the poppet valve 75a (as shown in dotted outline in FIG. 6), liquid can flow from the clean liquid tank 21 into the conduit 70, and the valve plate 75b is positioned at the non-slotted portion of the valve body 73, i.e., between the upper and lower slots 74 in the valve body 73. The valve plate 75b is of smaller diameter than the interior diameter of the valve body 73. Thus, there is some controlled flow or leakage of clean liquid past the valve plate 75b from the clean tank 21 down through the valve body 73 into the vacuum chamber 65.

Located in the pump space 22 is a pump indicated generally at 80 driven by a motor 81, the pump having its intake 82 located in the space 22 and its discharge outlet connected to a delivery conduit 83 for delivering clean liquid to the appropriate machining stations. A conduit 85 of relatively smaller diameter serves to by-pass a predetermined percentage of the pump output to the clean water tank 21. Any excess liquid introduced into the clean tank 21 merely flows back into the body 18 of dirty liquid.

The complete mechanism is under the control of a control panel 86 for controlling the pump 80, the conveyor 35, and the actuator 77. The control panel 86 also contains a fluid pressure switch responsive to the pressure in the vacuum chamber 65. The fluid motors 60 for indexing the individual drums may be actuated by timers incorporated into the control panel 86. The controls function as hereafter described.

In the operation of the device shown in FIGS. 1 through 5, the pump intake located in the space 22 pumps fluid through the outlet line 83 to the various machining stations. Clean liquid is supplied to the pump 80 from both the set of drums 45 and from the chamber 65 underlying the paper filter medium 32. The lessened pressure in the interior of the drums causes the flow of liquid through the drums to deposit contaminants on the perforate exterior surface of the drums provided by the wedgewire 46, the liquid flowing through the spaces between the wedgewires into the interior of the drum and through the axial outlet conduit 49 and the cap bore 50 into the chamber 66, the liquid then flowing through the slot 69 into the chamber 65 underlying the paper medium. Simultaneously, the pump inlet draws liquid through the paper medium to deposit contaminants on the upper exposed surface of the paper, the liquid passing through the paper and between the wedgewire support 26 into the chamber 65.

Liquid in the chamber 65 from both the drums 45 and the paper media 32 flows freely into the space 24 underlying the clean liquid tank bottom wall 70 at 23. The liquid then flows through the lower slots 74 of the valve body 73 into the center of the valve body and upwardly through the valve body to exit through the upper slots 74 into the duct 70. Liquid in the duct 70 flows out through the open bottom of the duct into the pump compartment 22 from which it is pumped by the pump 80.

Since the periphery of the drums is more "open" than the interstices of the "tight" paper medium 32, and since the combination of the three drums presents a large area to the dirty liquid, most of the liquid flowing to the pump is filtered by the drums. In a typical installation, and assuming a total flow of 1,000 gallon per minute through the filter system of the present invention, as much as 900 gallons per minute can be filtered by the drums and only 100 gallons per minute will be filtered through the paper medium. The flow rate through the drums is substantially higher than the flow rate through the paper, typically a flow rate of 50 to 60 gallons per minute per square foot will occur through the drums, while the flow rate through the paper is only about 5 gallons per minute per square foot. This lower flow rate through the paper allows the utilization of a tight paper with better cleanliness. Further, the combined high flow rate allows a small tank with minimal retention time on the order of about 1 to 2 minutes, as compared to the normal 5 to 7 minute retention time in a tank provided only with drums. The reason for this minimal retention time is that the scraped dirt from the drum does not need to settle out. Rather, it is filtered at the filter medium and removed by accretion onto the surface of the paper medium as the liquid in the tank 11 flows into the chamber 65.

In effect, the filtration through the paper medium 32 operates as a "polishing" filter in that a portion (about 10% in the above example) of the liquid is filtered to a much greater degree of clarity. For example, the liquid passing through the drums may well contain from 10 to 20 parts per million solid contaminant of a size up to 15 microns, while the liquid filtered through the paper medium contains only 3 to 5 parts per million, and the particulate has a maximum size of 3 to 5 microns. Thus, the filtration through the paper medium serves to remove fines from the liquid and, over a period of time, the clarity of the liquid circulated throughout the system is greatly enhanced.

As filtration proceeds, the drums will be periodically rotated relative to the scrapers 62 bearing against the exterior periphery of the drums. This is accomplished by actuating the cylinders 60 one or more times to incrementally rotate the drums 45 against the scrapers 62 in response to timers individual to the drums and incorporated into the control cabinet 86. Since a plurality of drums are provided, it normally is not necessary to interrupt the flow of liquid through the drums during the scraping cycle, nor is it necessary to supply additional liquid to the filtration system during the scraping cycle. As each drum is scraped, filtration through all the drums continues.

Of course, if desired or necessary, flow through any given drum or all of the drums can be interrupted during scraping, with clean fluid being supplied from a clean liquid reservoir as described in Reissue Pat. No. 32,135.

In order to renew the paper filtration medium, it is necessary to interrupt the flow of liquid through the paper medium. Otherwise, any attempt to move the filtration medium by actuating the conveyor 35 would merely tear the paper as it is held tightly against the supporting wedgewire 26 by the lessened pressure within the vacuum chamber 65 generated by venting the intake of the pump to the chamber 65.

When the paper medium becomes clogged with contaminants, the pressure drop across the paper medium increases, and the degree of vacuum in the chamber 65 changes. The vacuum in the chamber 65 is continuously monitored, and when it changes beyond a desired value, the paper medium renewal cycle is initiated. This cycle includes (1) actuating the pneumatic cylinder 77 to elevate the poppet valve assembly including the valve element 75a and 75b to the dotted position of FIG. 6, thus accommodating the flow of liquid from the clean tank 21 through the duct aperture 71 into the pump chamber 22 through the duct 70, while (2) accommodating the flow of some clean liquid from the tank 71 past the poppet valve element 75b downwardly into the chamber 24 and into the vacuum chamber 65 to alleviate the vacuum existing therein; when the vacuum in the chamber 65 is reduced, (3) reactivating the motor for the conveyor 35, with the conveyor movement carrying the clogged paper medium to the right as viewed in FIG. 1 and up the inclined tank wall 15 for discharge into the tote box 84; and the movement of the conveyor and the clogged filter medium (4) positioning a next expanse of clean paper filter medium over the vacuum chamber 65. The extent of movement of the conveyor 35 and the contaminated, previously-used medium is terminated either by a limit switch system (not shown) or by a timer to ensure the presentation of a sufficient expanse of new paper medium for the next filtration cycle.

Once the new paper medium has been positioned over the vacuum box 65 and the timer expires or the limit switch is actuated, it is merely necessary to actuate the poppet valve assembly 75a, 75b downwwardly by the motor 77 for normal filtration operation to be resumed.

Figure 7:
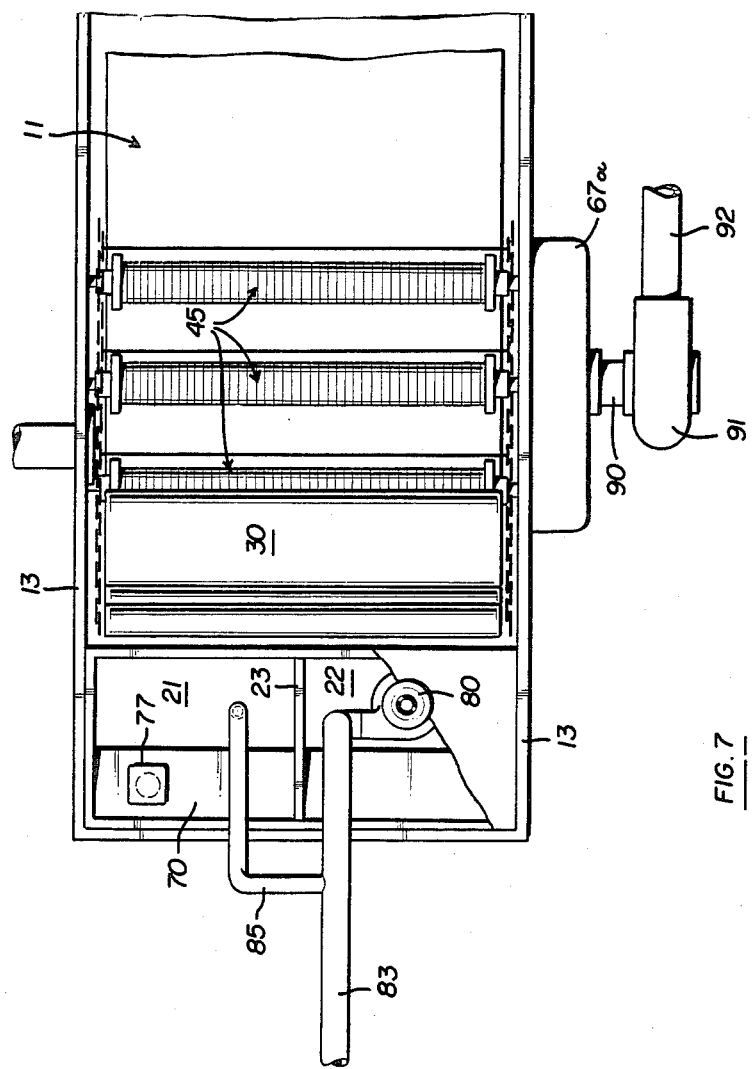
FIG. 7 is a view similar to FIG. 2 showing a modified form of the filtration apparatus of the present invention.

Turning now to that embodiment of the invention illustrated in FIG. 7 of the drawings, the structure of the filter and its operation is substantially the same, with a single change. The sheet metal enclosure 67a for the drum discharge chamber does not communicate with the vacuum chamber 65 underlying the paper filtration medium. Rather, the enclosure 67 is evacuated by connection directly to the intake 90 of a pump 91 separate and distinct from the pump 80 which has its intake connected to the vacuum chamber 65.

Thus, the pump 91 serves to draw liquid from the interior of the drums 45 directly into the intake 90 of the pump, and the clean liquid from the drums is circulated by the pump 91 through an outlet conduit 92 directly to the machining stations.

The primary difference between the embodiment of FIG. 6 and the embodiment of FIGS. 1 through 5 is that the liquid filtered at the drums 45 is separated from and circulated independently of the liquid filtered at the paper filtration medium 32. In the embodiment of FIGS. 1 through 5, the filtered liquid from the drums and the filtered liquid from the paper medium are comingled and circulated together throughout the machining system.

The system of FIG. 6 finds utility in those circumstances where liquid of the clarity obtained at the drums can be circulated to a series of machining stations, but additional machining stations are provided at which liquid filtered at the clarity of the paper filter medium is required. Thus, the two liquids are separately conveyed to their respective end use stations.

I claim:

1. A method of supplying machining coolant of a predetermined clarity to a plurality of machines and supplying to other machines a lesser volume of coolant of enhanced clarity containing less than about 5 PPM particles of a size less than about 5 microns, the method comprising the steps of:
   (1) dumping used coolant from all of the machines into a common pool;
   (2) pumping and filtering used coolant from the pool simultaneously through (a) a perforate filter drum to obtain a large volume of coolant of the requisite clarity for said plurality of machines, and (b) a paper filter medium located at the bottom of the pool to obtain a limited volume of clean coolant of enhanced clarity containing less than about 5 PPM particeles of a size less than about 5 microns for said other machines; and
   (3) circulating clean coolant of the requisite clarity from step (2)(a) to the plurality of machines and the clean coolant of enhanced clarity from step (2)(b) to those machines requiring same.

2. The method of claim 1 including the additional steps of removing particles accumulated on the surface of the perforate filter drum, collecting these removed particles on the paper filter medium, and removing these particles together with other collected particles from the common pool of coolant.

3. In a method of purifying a machining coolant for a machining system having a plurality of machining stations to which filtered coolant must be supplied, the improvement of eliminating fines from the filtered coolant to provide a coolant containing less than about 5 PPM particles of a size less than about 5 microns, the method of comprising the steps of:
   (1) dumping used coolant from all of the machining stations into a common pool;
   (2) pumping and filtering used coolant from the pool simultaneously through (a) a paper filter medium located at the bottom of the pool to obtain a volume of clean coolant of enhanced clarity containing less than 5 parts per million fines ranging from about 3 to 5 microns in size and (b) a perforate filter drum to obtain a substantially greater volume of clean coolant of lesser clarity; and
   (3) circulating coolant from both the filter drum and the paper medium to all of the machining stations.

4. A method of supplying a requisite volume of coolant of a given clarity to a plurality of machines and supplying to other machines a lesser volume of coolant of enhanced clarity containing less than about 5 PPM particles of a size less than about 5 microns, the method comprising the steps of:
   (1) dumping used coolant from all of the machines into a common pool;
   (2) separately and simultaneously pumping used coolant from the pool (a) through a perforate filter drum to obtain a large volume of coolant of the requisite clarity for said plurality of machines, and (b) through a paper filter medium communicating with the pool to obtain limited volume of clean coolant of enhanced clarity, the enhanced clarity coolant containing less than about 5 PPM particeles of a size less than about 5 microns; and
   (3) circulating the clean coolant of requisite clarity from step (2)(a) to the plurality of machines and the clean coolant from step (2)(b) to the machines requiring coolant of enhanced clarity.

5. The method of claim 4 including the additional steps of removing particles accumulated on the surface of the perforate filter drum, collecting these removed particles on the paper filter medium, and removing these particles together with other collected particles from the common pool of coolant.

6. A method of filtering a machining coolant for a machining system having a plurality of machining stations to which filtered coolant must be supplied, the improvement of eliminating fines from the filtered coolant to provide a coolant combining less than about 5 PPM particles of a size less than about 5 microns the method comprising the steps of:
   (1) providing a common pool of used coolant from all of the machinery stations;
   (2) filtering used coolant from said pool simultaneously (a) through a perforate filter drum to obtain at least about 80% of the total coolant required containing more than 10 PPM of particles of a size generally greater than about 10 microns and (b) through a paper filter medium located at the bottom to obtain the remaining required volume of clean coolant of enhanced clarity, containing less than about 5 PPM of fines in excess of from about 3 to 5 microns in size;
   (3) combining and circulating coolant from both the filter drum and the paper medium to all of the machinery stations; and
   (4) continuing to filter the smaller volume to enhanced clarity thereby effectively removing fines from the system coolant.

* * * * *